(No Model.)

J. K. HERR & J. G. DULEBOHN.
STOVE TRUCK.

No. 382,361. Patented May 8, 1888.

Witnesses.
Geo. A. Lane
Dan H. Herr

Inventor.
John K. Herr.
John G. Dulebohn.
By their Attorney
Wm. R. Gerhart

UNITED STATES PATENT OFFICE.

JOHN K. HERR AND JOHN G. DULEBOHN, OF ELIZABETHTOWN, PENNSYLVANIA.

STOVE-TRUCK.

SPECIFICATION forming part of Letters Patent No. 382,361, dated May 8, 1888.

Application filed February 16, 1888. Serial No. 264,291. (No model.)

*To all whom it may concern:*

Be it known that we, JOHN K. HERR and JOHN G. DULEBOHN, citizens of the United States, residing at Elizabethtown, in the county of Lancaster and State of Pennsylvania, have invented certain Improvements in Stove-Trucks, of which the following is a specification.

This invention relates to improvements in store and warehouse trucks, and has special reference to that class of such trucks which are adapted to move stoves or other articles which are supported somewhat above the floor.

The invention consists in a construction whereby the truck may be shoved under the article to be moved, elevate the load from the floor, carry it to its destination, and there unload it by lowering it again to the floor.

Figure 1:
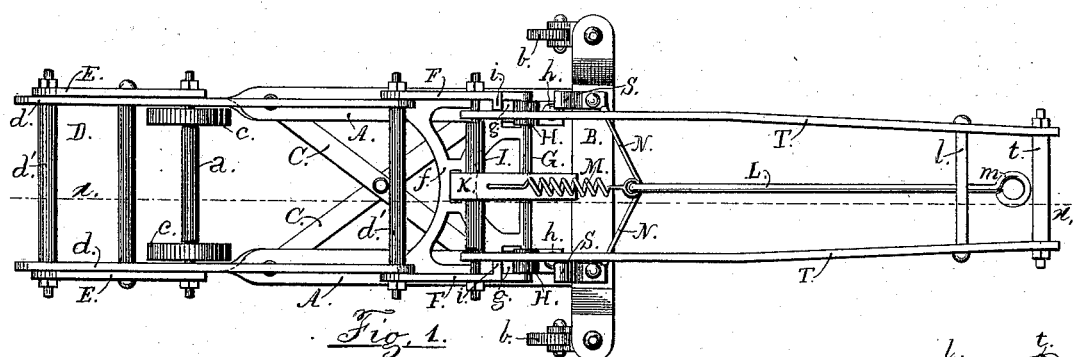
Figure 2:
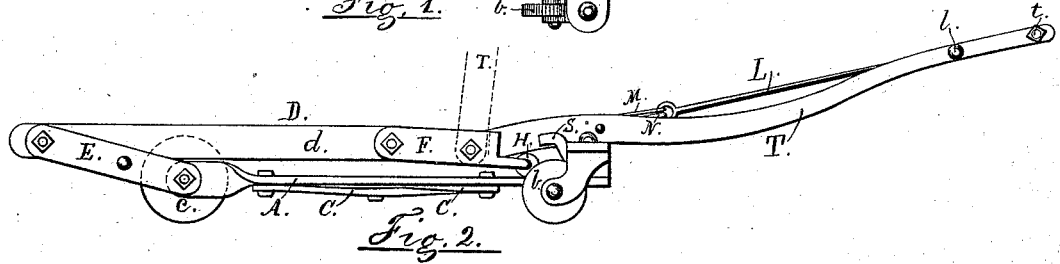
Figure 3:
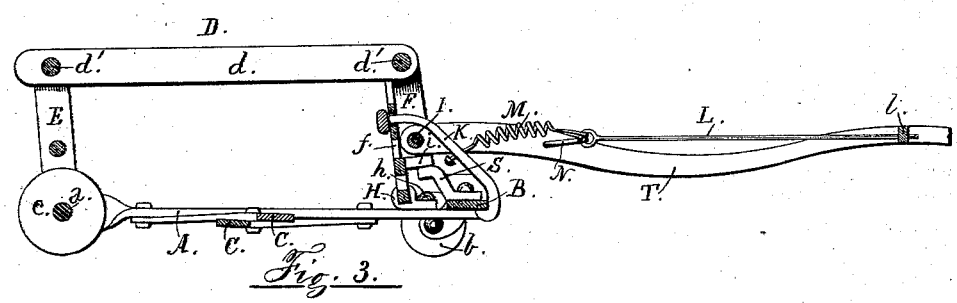
Figure 4:
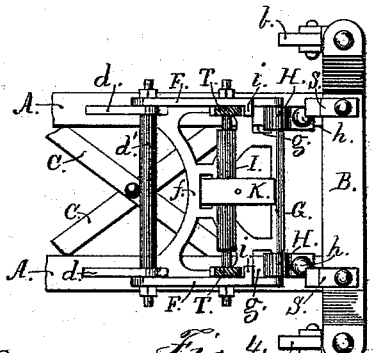

In the accompanying drawings, Figure 1 is a top or plan view of our improved truck with the elevating platform or bed in position to be loaded. Fig. 2 is a side elevation of the same. Fig. 3 is a longitudinal vertical section as the truck appears when the platform is raised in the position occupied when supporting a load. Fig. 4 is a front end elevation with portions cut away.

Similar letters of reference indicate similar parts in the respective figures.

A A are side frame-pieces connecting the rear axle, $a$, and the transverse front plate, B.

C C are diagonal stiffening-braces connecting the side pieces, A A. The side pieces, A A, engage the axle $a$ outside of the wheels $c\ c$, and support the transverse plate B on their front ends. This plate B extends beyond the side pieces, A A, and has the front wheels, $b\ b$, swiveled thereto, after the manner of casters to the legs of furniture, to facilitate turning. This widening the front bearing of the truck is done in order that the stability of the same may be increased.

D is the elevating platform or bed, which consists of the side bars, $d\ d$, and the transverse rods $d'\ d'$, to which said bars $d\ d$ are pivoted. Posts E F are loosely connected with the rods $d'\ d'$ outside of the bars $d\ d$, the former being pivoted to the axle $a$ outside of the side pieces, A A, and the latter journaled to the front ends of said pieces just back of the plate B.

The posts F are integrally connected by an ornamental brace, $f$, and transverse bar G. There are openings $g$ cut through the lower ends of posts F to permit them to be journaled to the pieces A by the eyes H, secured to said pieces A by bolts $h$. Spring-thills T are loosely pivoted to the cross-rod I, having its bearings in the posts F, and are connected in front by the rod $t$. The tendency of the inner ends of the thills is to spring outward, thus keeping them in engagement with the lips $i$, projecting inward from the posts F somewhat above the openings $g$, through which they are journaled to the frame.

K is a hook hinged in the center of the ornamental brace $f$, and adapted to engage the front edge of the plate B when the platform D is elevated.

M is a spring connecting the hook K and the inner end of the rod L, which passes through the cross-bar $l$ and is provided with a handle, $m$. Springs N also connect the inner ends of the thills with the end of the rod L.

S S are stops placed on the frame in front of the posts F to prevent the platform from falling forward when raised.

Operation: When the platform is lowered to raise a load, the thills are out of engagement with the lips $i$ and rest against their edges, as shown in Figs. 1 and 2. To elevate the platform the outer ends of said thills are raised into a vertical position, when they spring into engagement with the lips, as shown in the drawings. The thills are now used as levers, and by pressure upon their outer ends raise the platform by their action upon the lips $i$. As the posts E F assume a vertical position, the hook K, the end of which has been pushed forward during the operation, engages automatically with the front edge of the plate B, and the posts F are brought to bear against the stops S S. In lowering the load the hook is released from the plate B and the thills disengaged from the lips $i$ by pulling the rod L outward, the descent of the platform being regulated by force exerted upon the thills.

Having thus described our invention, what we claim as new, and desire to secure by Letters Patent, is—

1. In a truck, the combination, with the frame, the platform, and the pivotally-connecting posts, the front posts being provided with lips, as specified, of the spring-thills, and a device whereby they may be disconnected from the lips, substantially as and for the purpose specified.

2. In a truck, the combination, with the frame, the platform, and the pivotally-connecting posts, the front posts being provided with lips, as specified, of thills for engaging said lips, and a hook attached to said front posts and engaging with the frame, and a device for simultaneously disengaging the thills and hook from the lips and frame, respectively, substantially as specified.

3. In a truck, the combination, with the frame, the platform, the connecting-posts, the front posts being provided with lips, as specified, the hook for grasping the front of the frame, and spring-thills for engaging said lips, of springs connecting the hook and thills with the rod L, whereby said hook and thills may be simultaneously disengaged from said frame and lips, respectively, substantially as and for the purpose specified.

JOHN K. HERR.
JNO. G. DULEBOHN.

Witnesses:
I. N. S. WILL,
ADAM REEM.